United States Patent [19]

Nakane et al.

[11] Patent Number: 5,590,899
[45] Date of Patent: Jan. 7, 1997

[54] AIRBAG DEVICE

[75] Inventors: Naoki Nakane, Toyota; Kazuo Sakakibara, Okazaki; Tadashi Ozaki, Gamagoori; Koji Ohtaka, Chiryu, all of Japan

[73] Assignee: Nippondenso Co., Ltd., Kariya, Japan

[21] Appl. No.: 421,968

[22] Filed: Apr. 14, 1995

[30] Foreign Application Priority Data

Apr. 18, 1994 [JP] Japan .................................. 6-104809
Feb. 27, 1995 [JP] Japan .................................. 7-064925

[51] Int. Cl.$^6$ ............................ B60R 21/16; B60R 21/32
[52] U.S. Cl. ................................ 280/728.2; 280/734
[58] Field of Search ............................ 280/728.2, 734, 280/735, 741

[56] References Cited

U.S. PATENT DOCUMENTS 4,358,135  11/1982  Tsuge et al. .......................... 280/806
5,069,479  12/1991  Koide et al. ......................... 280/734
5,165,717  11/1992  Tanaka ................................ 280/734
5,244,229   9/1993  Breed et al. ......................... 280/734

FOREIGN PATENT DOCUMENTS 547443     6/1993  European Pat. Off. .
63-235144  9/1988  Japan .

*Primary Examiner*—Kenneth R. Rice
*Attorney, Agent, or Firm*—Cushman, Darby & Cushman

[57] ABSTRACT

An airbag device 1 is composed of an inflator 2, a bag 3 and an electronic control unit (ECU) 4 created as a single unit as well as a pad 6 which is attached to the steering unit 5. There is connection from the ignition device 8 of the inflator 2 to the circuit board 18 by means of a connector 8a. The connector 8a realizes short-circuiting by means of external shorting member. In assembly operations of the airbag device, the shorting member can be easily removed to release the short-circuiting of the connector 8a. As a result, when attaching the airbag device to the ECU 4 the connector 8a does not occupy excessive space and there is no reduction in the assembly efficiency of the airbag device.

22 Claims, 16 Drawing Sheets

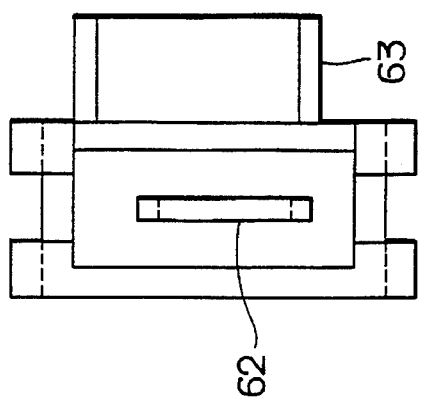
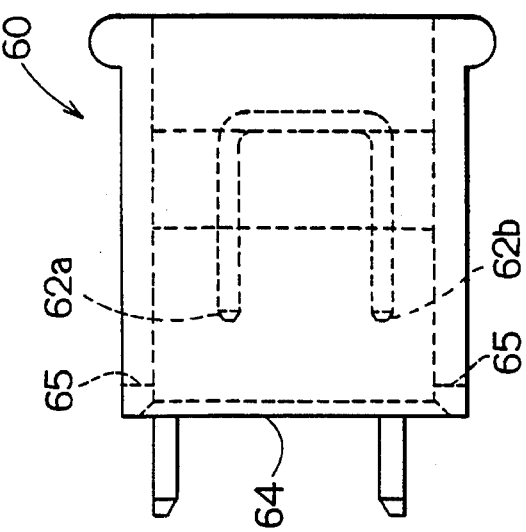
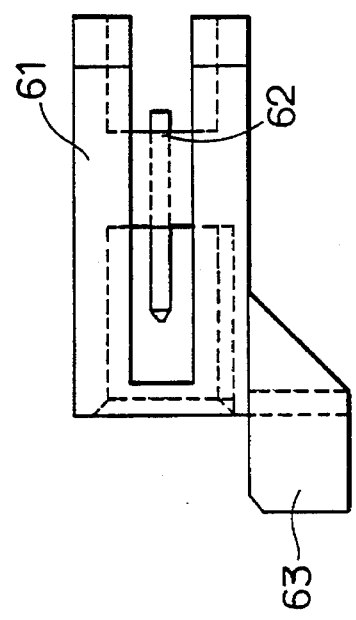
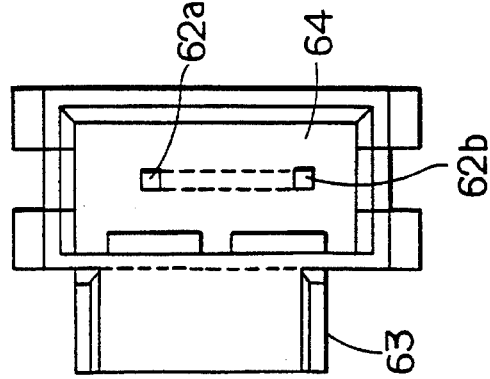

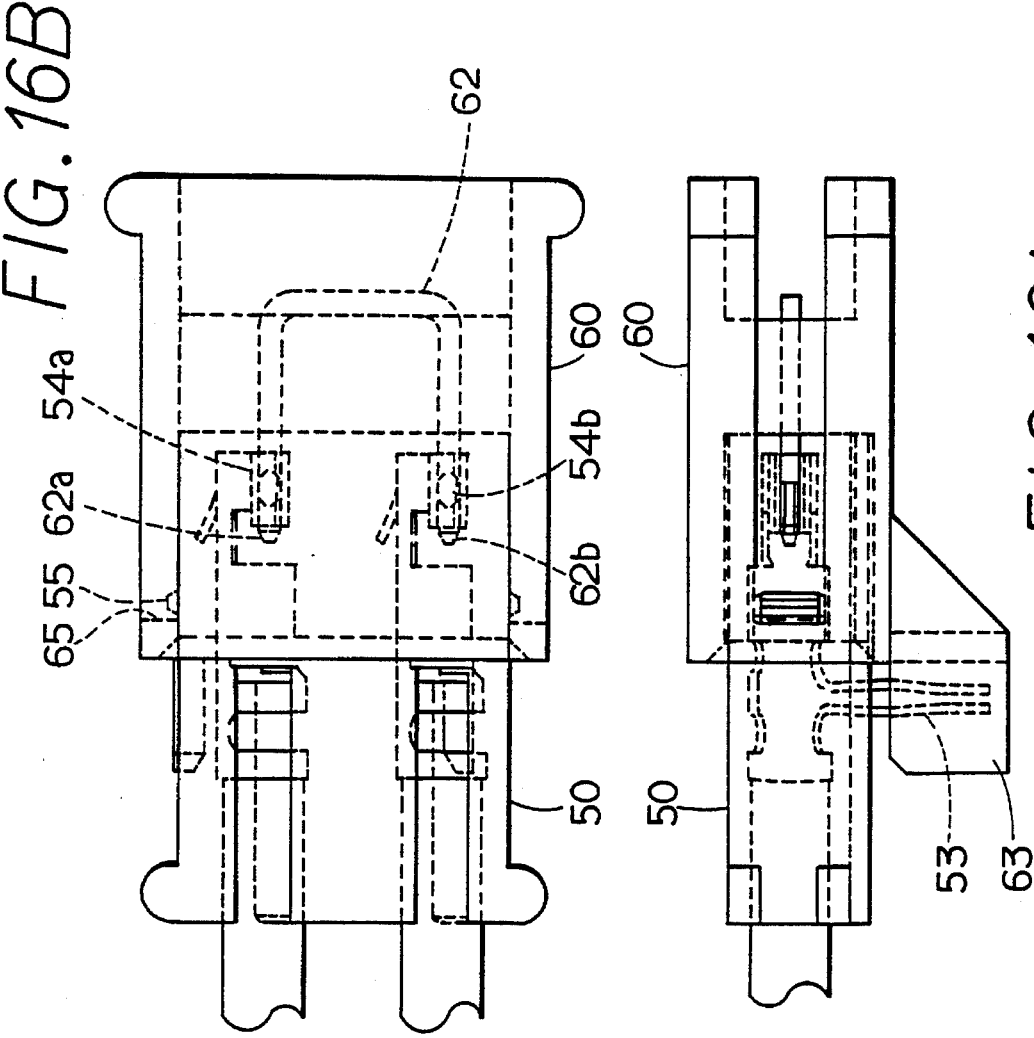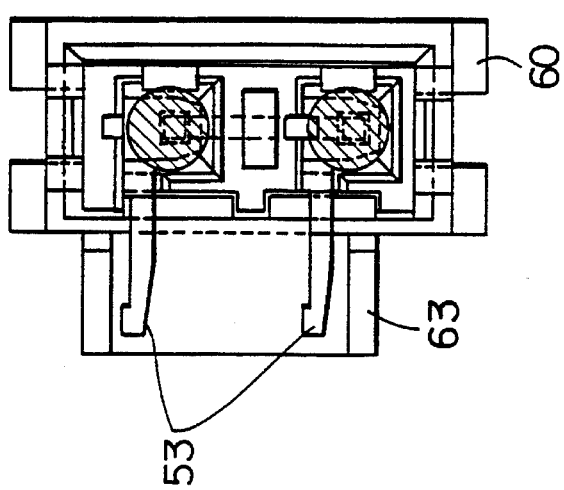

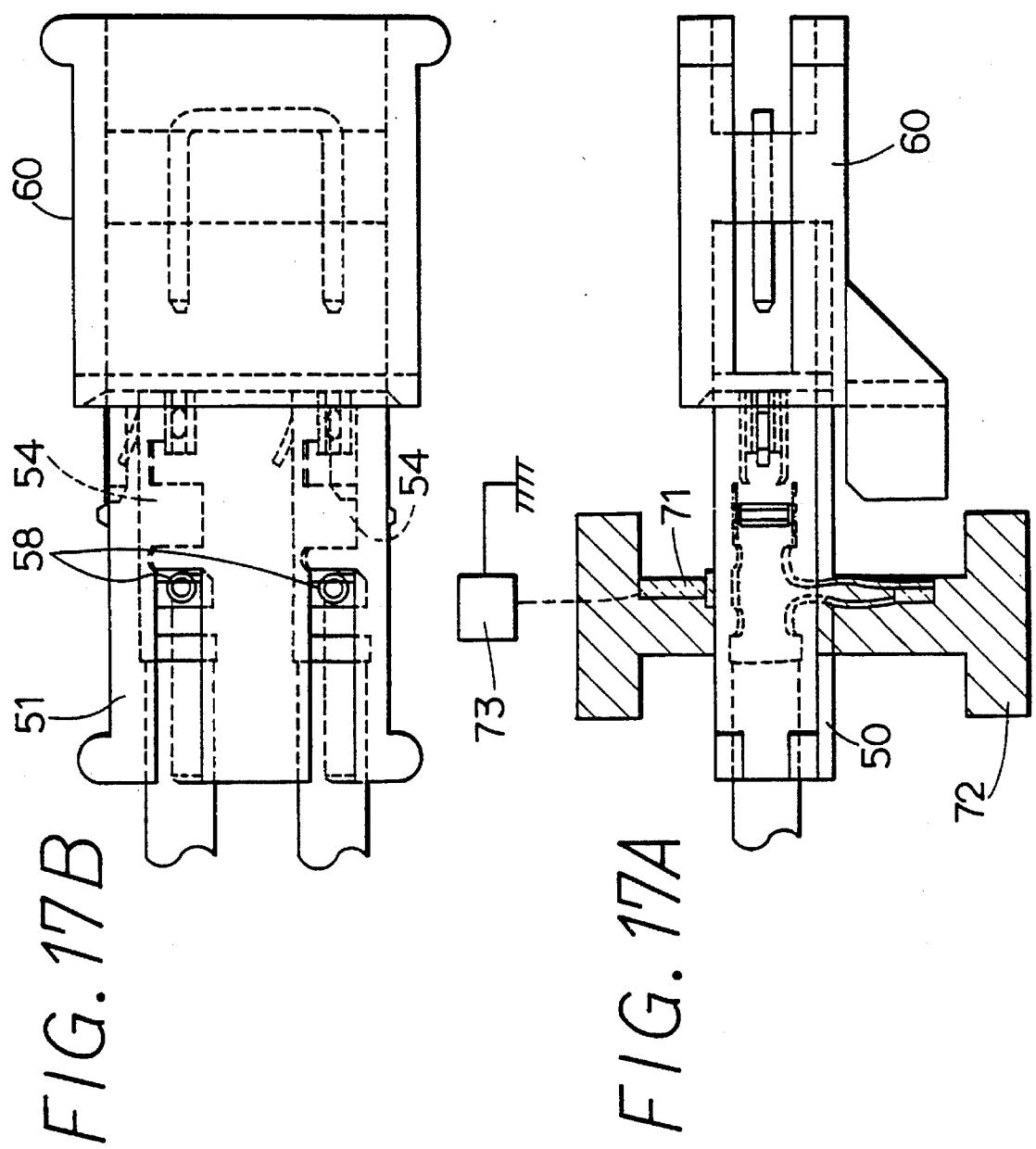

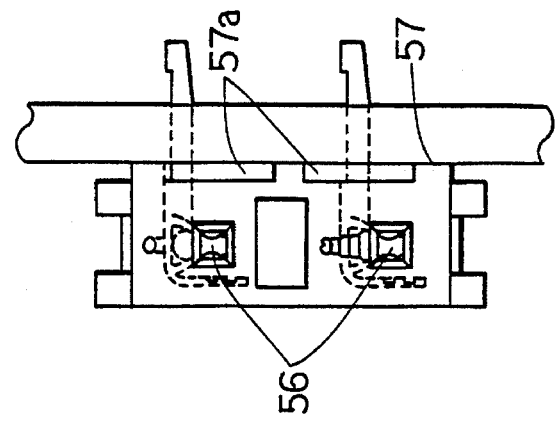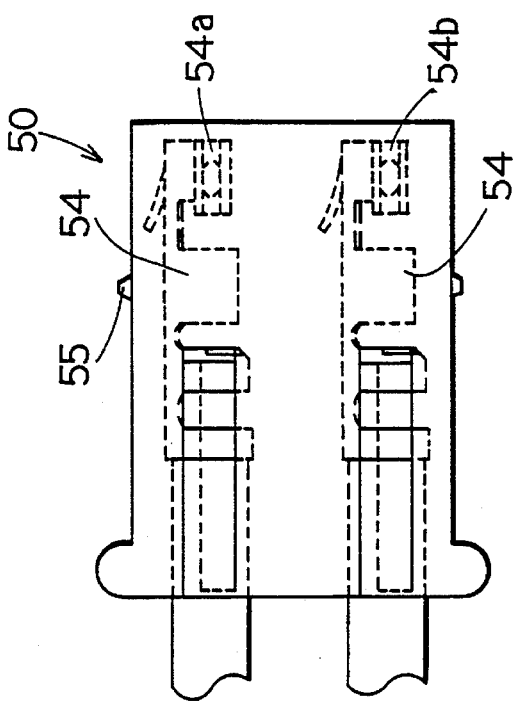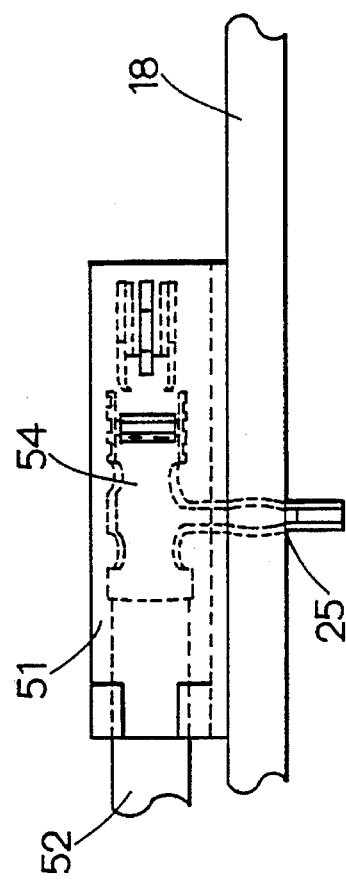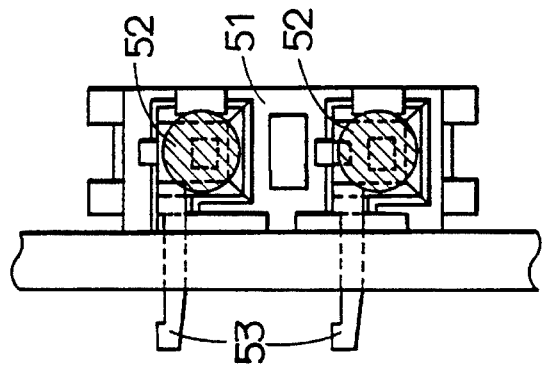

AIRBAG DEVICE

CROSS REFERENCE TO RELATED APPLICATION

This application is based upon and claims priority from Japanese Patent Application No. Hei. 6-104809 filed Apr. 18, 1994, and No. Hei. 7-64925, filed Feb. 27, 1995, the contents of which are incorporated herein by reference.

BACKGROUND OF THE INVENTION

1. Field of the invention

The present invention relates to an airbag device that is used for protecting a vehicular occupant of a motor vehicle, in particular a type of vehicle-use airbag device installed in a steering wheel.

2. Related Art

Airbag devices employed in recent years comprise an inflator to cause generation of gas and inflation of a bag upon a vehicle collision, and an electronic control unit (hereafter known as ECU) to cause operation of the inflator in case of the vehicle collision. The ECU is conventionally located in a position separated from a steering wheel where the bag and the inflator are located in order to avoid decreasing signal detection sensitivity of a acceleration sensor installed in the ECU in case of the vehicle collision. However, this requires separate attachment procedures, and the inflator requires use of an explosive, thus resulting in the attachment procedures with poor operability. In the attachment procedures, connecting wires from the inflator are prepared in a short-circuited state with a shorting member in order to prevent an accidental operation thereof. As a result, the inflator guards against the danger of the accidental operation due to a leakage current caused by induction from the outside. When the connecting wires from the inflator are connected to the ECU during assembly of the airbag device, the shorting member which keeps the connecting wires in a short-circuited state are removed.

Thus, for the sake of improving operational efficiency during the assembly, an airbag device has been developed in which the ECU is inserted in a pad which also houses the inflator and the bag. The airbag device is installed in a cone section in the steering wheel.

An example of such an airbag device is shown in FIG. 18. In FIG. 18, an end of a cable 140 from an inflator 130 is connected electrically with a printed circuit board inside a housing of an ECU 100 with a connecter (or soldering of the end of the cable 140). When a vehicle collision has occurred, the ECU 100 sends an electrical current through cable 140 to ignite a squib of the inflator 130. Then, the inflator 130 generates gas to inflate a bag 150. With such a structure, a space must be created within a pad 180 in order to wire the cable 140 from the inflator 130 to the ECU 100, and there arises a problem that the airbag device within the pad 180 becomes quite large (thus increasing the cone depth). Also, in order to prevent accidental operation of the inflator 130 which is not connected to the ECU 100 due to electrical interference (by static electricity, etc.), a shorting member short-circuits between the terminals of the connector attached to connecting wires from the inflator 130. In such a device, the shorting member is formed inside the connector or there is another connector for short-circuiting, and thereby a complex structure for the short-circuiting is required. As a result, the connector becomes too large to be located on the board of the ECU housing, creating a larger airbag device and contributing to higher production costs.

SUMMARY OF THE INVENTION

For this reason, the purpose of the present invention is to provide an airbag device in which an ECU, a bag and an inflator are installed in a case and to connect the inflator and a printed circuit board of the ECU with a connecting member having a shorting member that is low-priced, simple and compact.

To achieve the purpose, an airbag device according to the present invention comprises: an inflator generating gas at time of operation; an airbag which is deplayed by the gas from the inflator; deceleration detection means that detects a deceleration in case of a vehicle collision and outputs a detection signal; an electronic control circuit that determines based on the detection signal from the deceleration detection means whether the vehicle collision has occurred and outputs an operational signal to cause the inflator to operate; a pad for containing the inflator, the airbag and the electronic control circuit; connecting member having a plurality of terminals and attached to an end of the electronic control circuit side of a connecting cable transmitting the operational signal to the inflator; and a shorting member for short-circuiting the terminals at least until the terminals are electrically connected to the electronic control circuit, the electrical connection being made by inserting the terminals in attachment holes of a board on which the electronic control circuit is formed.

It is possible to carry out the electrical connection between the connecting member and the board by employing the terminals of the connecting member and the attachment holes on the board. Thus attachment procedures can be simplified. Furthermore, since the shorting member short-circuits the terminals up to the time when the connecting member is attached to the board, it is possible to prevent an accidental operation (an accidental ignition) of the inflator due to external factors such as static electricity.

In the airbag device, the inflator and the bag can be fixed on a housing of the electronic control circuit. In this case, the connecting cable transmitting the operational signal to the inflator passes through an opening formed at the housing and is pulled out to the vicinity of the board, after that, the terminals of the connecting member are inserted in the attachment holes of the board to maintain electrical conduction with the electronic control circuit. It is possible to decrease the size of the airbag device, because the housing of the electronic control circuit is used for fixing the inflator and the bag.

The connecting member can include release means to release the short-circuiting of the terminals when the terminals are inserted in the attachment holes of the board. By means of the release means, it is possible to more easily release the short-circuiting of the terminals.

A hole portion as the release means can be formed on the side of the attachment holes of the board. In this case, when the terminals of the connecting member are inserted in the attachment holes, the short-circuiting of the terminals is released by hooking the shorting member onto the hole portion. Thus, it is possible to easily release the short-circuiting of the terminals by including the hole portion in the board.

The shorting member can be temporarily hold to the connecting member so that the shorting member separates from the connecting member to release the short-circuiting of the terminals when the terminals of the connecting member are inserted in the attachment holes of the board. Thus, it is possible to remove the shorting member from the board when the connecting member is attached to the board.

The shorting member can be attached to the connecting member so that the shorting member slides and releases the short-circuiting of the terminals when the terminals of the connecting member are inserts in the attachment holes. Thus, it is possible to release the short-circuiting without including a hole portion in the board.

A release member as the release means can be installed in the connecting member so that the release member is pushed by the board and moves to release the short-circuiting with the shorting member when the terminals of the connecting member are inserted in the attachment holes in the board. As a result, it is possible to release the short-circuiting through the movement of the release member, thus making it possible to more reliably release the short-circuiting of the terminals.

The shorting member can be installed in the connecter member so that the shorting member rotates to release the short-circuiting of the terminals when the terminals are inserted in the attachment holes of the board. As a result it is possible to confirm whether the short-circuiting is released or not from the rotation state of the shorting member, thus making it possible to carry out more reliable release of the short-circuiting.

The terminals can be soldered to the board. It is possible to secure an electrical conduction with the electronic control circuit. In this case, the shorting member for short-circuiting the terminals is established to be independent of the connecting member. Therefore, it is possible to make the connecting member more compact, thus realizing a lighter and smaller airbag device and contributing to lower costs.

The release member can be established to be independent of the connecting member. In this case, the release member releases the short-circuiting of the terminals when the terminals of the connecting member are soldered to the board. Thus, because the release member is not included in the connecting member, it is not necessary to make the structure of the connecting member more complex. This makes it possible to miniaturize the connecting member.

At least either one of the connecting member or the shorting member can include a lock mechanism for connecting the connecting member and the shorting member. As a result, before attaching the connecting member to the board, it is possible to create a structure in which it is more difficult for the shorting member to easily come off due to external factors such as vibration during transport.

The shorting member can have a guard section to guard the terminals when the shorting member is connected to the connecting member. As a result, before attaching the connecting member to the board, there is no warping of the terminals due to external factors such as vibration during transport.

The connecting member can include an exposure section for the terminals thereof. As a result, it is possible to bring a test probe in contact with the terminals via the exposure section, thus making it possible to conduct properties tests beforehand on a resistance of the inflator, etc. so that the attachment of the connecting member to the board is carried out after determining the properties. The device is then also capable of automatic testing, thus improving the quality and the production efficiency of the device.

The shorting means can be attached to the terminals so that the terminals can not be attached directly to the board in a state that the shorting means is attached to the terminals, and the terminals can be attached to the board only after removing the shorting member. As a result, it is not possible to attach the connecting member to the board without removing the shorting member, thus making it possible to carry out more reliable release of the short-circuiting of the terminals.

A gap can be created between the connecting member and the board. As a result, when spreading a dehumidifying agent to remove humidity from the surface of the board, the gap between the connecting member and the board creates an escape for the dehumidifying agent. Thus, the dehumidifying agent does not stay on the surface of the board so that it is possible to evenly distribute the dehumidifying agent on the surface of the board, thereby improving the quality of the airbag device.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIGS. 14A through 14D are views illustrating a construction of a connecting member, FIG. 14A being a front view, FIG. 14B being a top plan view, FIG. 14C being a left side view, and FIG. 14D being a right side view;

FIGS. 15A through 15D are views illustrating a construction of a short retainer, FIG. 15A being a front view, FIG. 15B being a top plan view, FIG. 15C being a left side view, and FIG. 15D being a right side view;

FIGS. 16A through 16C are views illustration a fitting condition of a connecting member and a short retainer, FIG. 16A being a front view, FIG. 16B being a top plan view, and FIG. 16C being a left side view.

FIGS. 17A and 17B are views illustrating a condition when measuring a contact resistance of an inflator, FIG. 17A being a front view, and FIG. 17B being a top plan view.

DETAILED DESCRIPTION OF THE PREFERRED EMBODIMENTS

The preferred embodiments of the present invention will be described in detail with reference to the attached figures.

Figure 1:
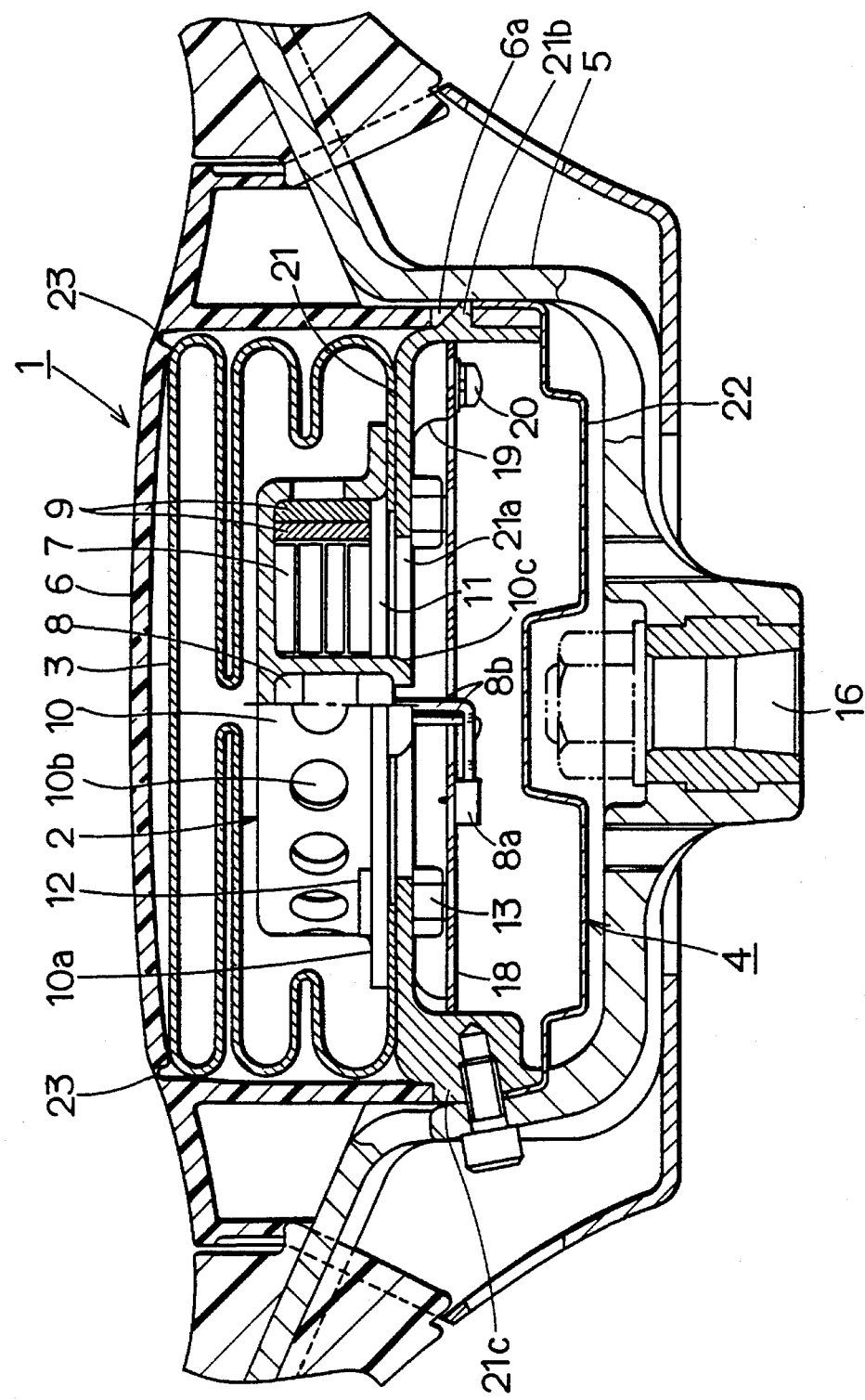
FIG. 1 is a cross-sectional view of the airbag device that is the first embodiment of the present invention.

FIG. 1 is a cross-sectional view of an airbag device related to the first embodiment of the present invention. An airbag device 1 is composed of a bag 3 which inflates with gas generated by an inflator 2 when a vehicle collision has occurred, an electronic control unit 4 (hereafter: ECU) which causes the inflator 2 to operate upon the vehicle collision, and a pad 6 in which inflator 2, bag 3 and ECU 4 are housed as a single unit, and which is attached to a steering unit 5.

The inflator 2 is composed of a gas generant 7 which generates gas by means of combustion, an ignition device 8 to ignite the gas generant 7, a filter 9 to remove solid objects from the generated gas and decrease gas temperature, and a case for housing the gas generator 7, the ignition device 8 and the filter 9. The case is composed of a case body 10 including a flange 10a, and a base plate 11 to cover the opening of the case body 10.

Included on the peripheral walls of the case body 10 are a plurality of gas emission holes 10b for emitting gas generated by the gas generant 7. A cylindrical housing box 10c to house the ignition device 8 is located in the center of the case body 10. The ignition device 8 housed in a housing box 10c includes connector cables 8b for electrical connection with the ECU 4, as well as a connector 8a which is a connecting member attached to an end of a connector cable 8b. The connector cable 8b is obtained from the housing box 10c. FIG. 1 only shows the length necessary so that the connector cable 8b can be attached with a circuit board 18. Actually, however, even in a state where the circuit board 18 is removed from a main housing 21, there is sufficient length that the connector cable 8b can be connected to the circuit board 18. Thus, with the circuit board 18 attached to a main housing 21, the excess portion of the connector cable 8b is housed in the space between the board 18 and the housing 21.

The base plate 11 presents a circular body possessing a round hole in its center so that, when the opening of the case body 10 is covered with the base plate 11, the edge of the housing box 10c is emerging from the hole in the base plate 11.

The bag 3 includes a fastening hole for passing a bolt 12 attached to a flange 10a of the inflator 2, and also includes an exhaust hole for release of gas generated by the inflator 2. Furthermore, the bag 3 includes an insertion hole which is created with a circular shape and inserts the inflator 2 into the bag 3.

Figure 12:
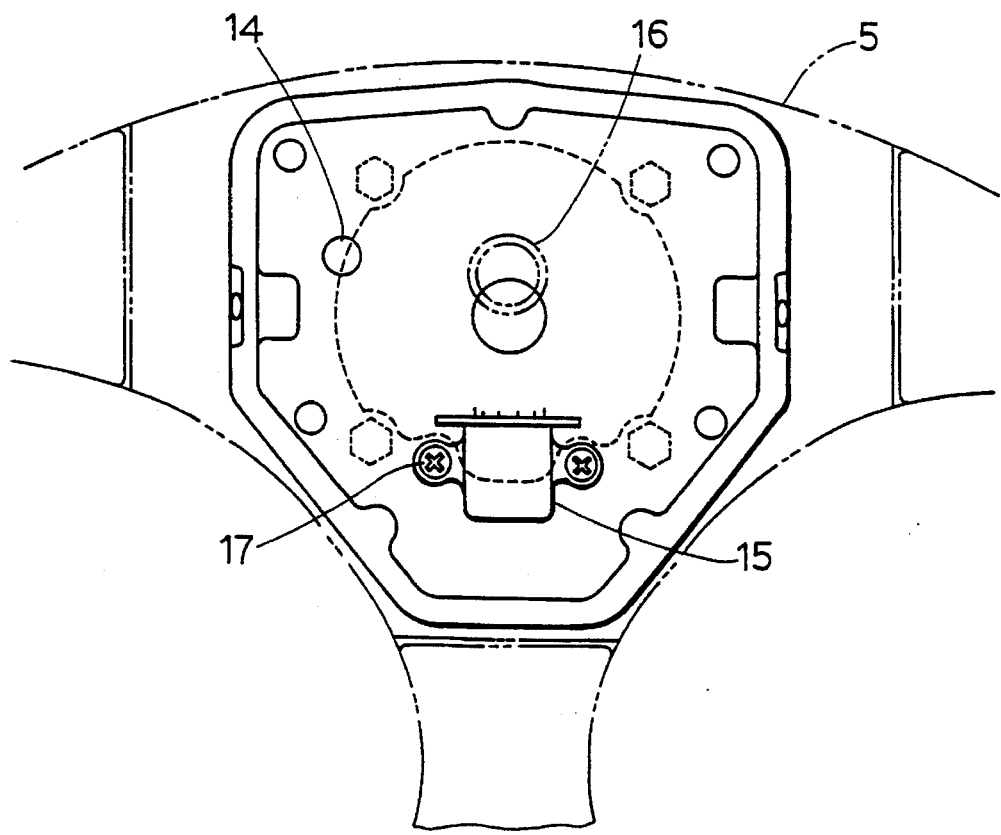
FIG. 12 is a view illustrating an arrangement of acceleration sensors in the ECU.

The ECU 4 includes an electronic acceleration sensor 14 (see FIG. 12) for detecting an acceleration (or deceleration) of a vehicle and outputting a detection signal, a mechanical acceleration sensor 15 (see FIG. 12) and a collision determining circuit (not shown in figure) to determine based on the detection signal from the electronic acceleration sensor whether the vehicle collision has occurred, and an ignition circuit (not shown in figure) to output an ignition signal to the ignition device 8 of the inflator 2 when the occurrence of the vehicle collision is determined by the collision determining circuit. These sensors and circuits are arranged on the circuit board 18.

The mechanical acceleration sensor 15 is included inside the steering unit 5. To maintain a detection sensitivity of the mechanical acceleration sensor 15 regardless of rotation of the steering unit 5, it is attached by means of a screw 17 to a hub (not shown in figure) so that the stroke direction of an inertial object of the mechanical sensor 15 is parallel to an attachment axis 16 of the steering unit 5.

The collision determining circuit and the ignition circuit are arranged on the circuit board 18 together with a power source circuit and fault detection circuit (both not shown in the figure). The circuit board 18 is secured by means of a screw 20 to nut sections 19 created in an appropriate location in the main housing 21.

The housing is composed of the main housing 21 and a cover 22. The main housing 21 includes a circular attachment hole 21a created in the center of the ceiling. Included around the attachment hole 21a at four locations are fastening holes (not shown in figure) for passing the bolts 12 which are attached to the flange 10a of the inflator 2. The attachment hole 21a of the main housing 21 is formed to electrically connect the ignition device 8 housed in the inflator 2 and the circuit board 18. It is created larger than the external diameter of the housing box 10c for housing the ignition device 8. Included on the external surface of the main housing 21 are a plurality of claws 21b used when attaching with a pad 6. There are also attachment sections 21c to the left and right to secure the ECU 4 to the steering unit 5.

After attaching the inflator 2 and the bag 3 on the housing body 21, the cover 22 is secured to the main housing 21 by means of screws (not shown in figure). The external periphery of the cover 22 is folded toward the housing body 21 in order that the ends of the pad 6 attached to the main housing 21 can be sandwiched between the main housing 21 and the folded cover 22. This is in order to prevent slipping of the pad 6 when the bag 3 inflates.

Figure 13:
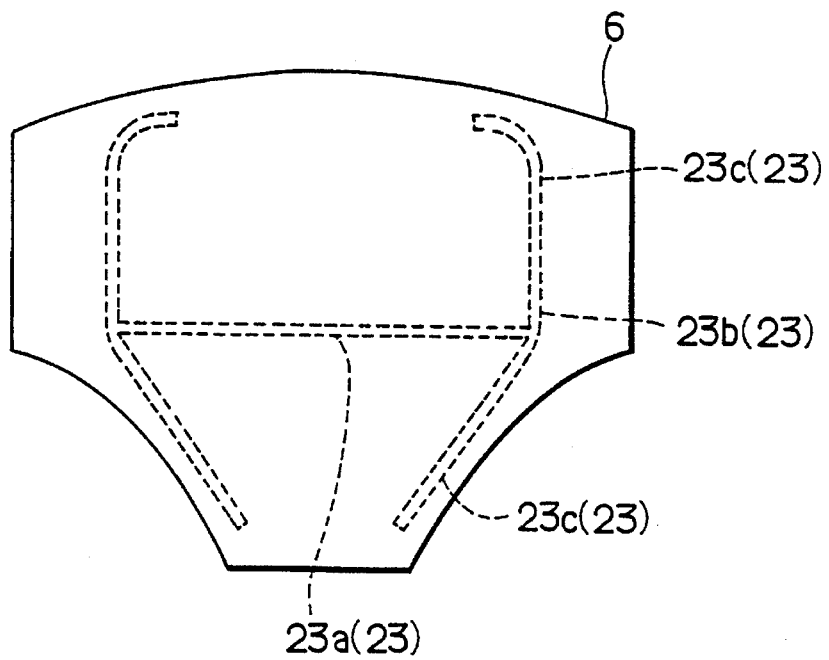
FIG. 13 is a view illustrating a groove on a pad surface of a steering wheel.
Figure 18:
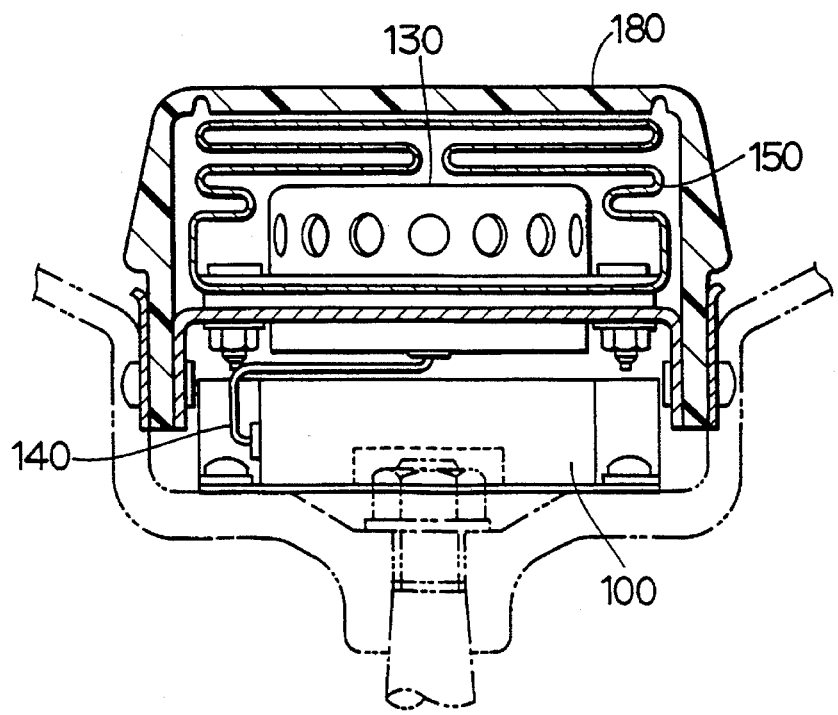
FIG. 18 is a cross-sectional view of the conventional airbag device attached to the steering wheel.

The pad 6 includes a lip line 23 which is broken upon expansion of the bag 3. The lip line 23 can be formed, for example, in the shape of an abbreviated H as shown in FIG. 13, so that the thickness of the lip line 23 differs at different locations. In more detail, the lip line 23 includes lip line 23a extending in a horizontal direction, and lip line 23c extending from lip line connection section 23b, which connects with the lip line 23c on both ends of the lip line 23a. The thickness of the lip line 23a is the thinnest, and the thickness of the lip line 23c is the thickest. As a result, when the bag 3 inflates, the lip line 23a is the first to break, and then breakage of the lip line connecting section 23b and the lip line 23c take place.

Included on the lateral surface of the pad 6 are multiple fitting holes 6a for fitting with the claws 21b created on the main housing 21. The pad 6 does not use tightening devices such as screws, bolts or rivets, etc. Instead, attachment with the main housing 21 is achieved by fitting of the claws 21b created on the main housing 21 and the fitting holes 6a.

Next follows a description of the connecting method for connecting the connector 8a and the connector cable 8b to the circuit board 18 as shown in FIG. 1.

(1) After securing the inflator 2 together with the bag 3 on the main housing 21 by means of the bolt 12 and the nut 13, the connector 8a on the end of the connector cable 8b that has been pulled out is inserted in the attachment hole of the circuit board 18 before the circuit board 18 is secured to the main housing 21. At this time, there is release of the short-circuiting due to the shorting member included on the connector 8a by means of the insertion.

(2) There is soldering of the terminals of the connector 8a which has been inserted, and the circuit board 18 is screwed to the main housing 21.

(3) Then, the cover 22 is placed on the pad 6 and the pad 6 is attached to the attachment section on the steering unit 5.

In the first embodiment, there is use of a small connector as the connecting member connecting to the circuit board 18. Creating a small configuration for the connector 8a attached to the circuit board 18 decreases the attachment space between the inflator 2 and the ECU 4, which is extremely effective when inserting the airbag device 1 inside the narrow steering unit 5. The ignition device 8 is in the center of the inflator 2, so the connector cable 8b and connector 8a are pulled downward from the center of the inflator 2. In the present invention, it is indicated that, even when the connector 8a is used, it is possible to attach to the circuit board 18 without taking up additional space.

It is difficult with a small connector to equip the shorting member therein. In the present invention there is no addition of larger parts to the connector itself. Instead, the short-circuiting is achieved with external shorting member 24, etc. Or, shorting member 24 being a small size are arranged inside the connector to create the short-circuiting. This is so structured that, when carrying out attachment, the short-circuiting of the shorting member 24 can easily be released. As a result, when attaching the ECU 4 as a single unit to the airbag device, the device does not take up excessive space and there is no decrease in operational efficiency in creating the airbag device.

Figure 2A:
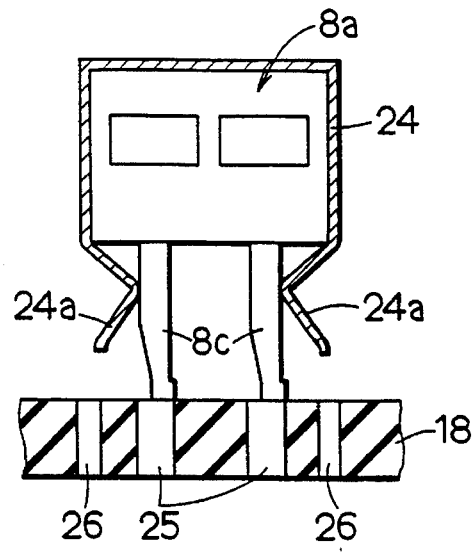
FIGS. 2A through 2C are views illustrating a shorting member of a connecting member in the first embodiment.
Figure 2B:
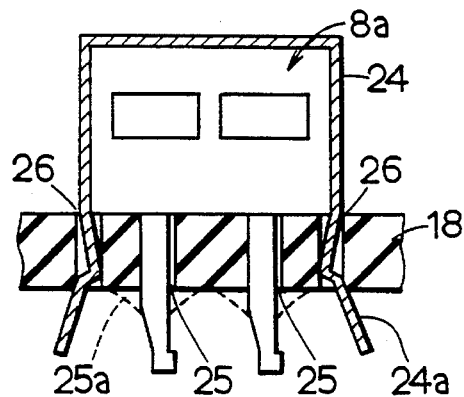
Figure 2C:
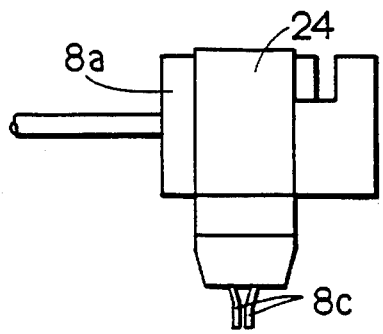

FIGS. 2A through 2B are views illustrating an enlargement of the example of the connector 8a as shown in FIG. 1. FIG. 2A shows a structure in which the shorting member 24 composed of conducting material such as stainless steel is formed and attached to the periphery of the connector 8a. FIG. 2B is a view illustrating a state which the connector 8a is attached to the circuit board 18. FIG. 2C is a side view of the connector 8a attached the shorting member 24. Before the connector 8a is attached to the circuit board 18, end portions 24a of the shorting member 24 are simultaneously in contact with multiple pins 8c as terminals, and thereby the multiple pins 8c are short-circuited. As shown in FIG. 2B, the pins 8c of the connector 8a are inserted in the attachment holes 25 of the circuit board 18. When the pins 8c of the connector 8a are inserted, the end portions 24a of the shorting member 24 enters the holes 26 formed as a release means just to the side of the attachment holes 25. As the result, the end portions 24a of the shorting member 24 separate from the pins 8c and are maintained in a state where the short-circuiting is released. In this state, the pins 8c of the connector 8a of the back side of the circuit board 18 is soldered (25a) to secure the connector 8a. As the result, complex operations are not required when attaching the connectors 8 and the attachment is realized simply.

Figure 3A:
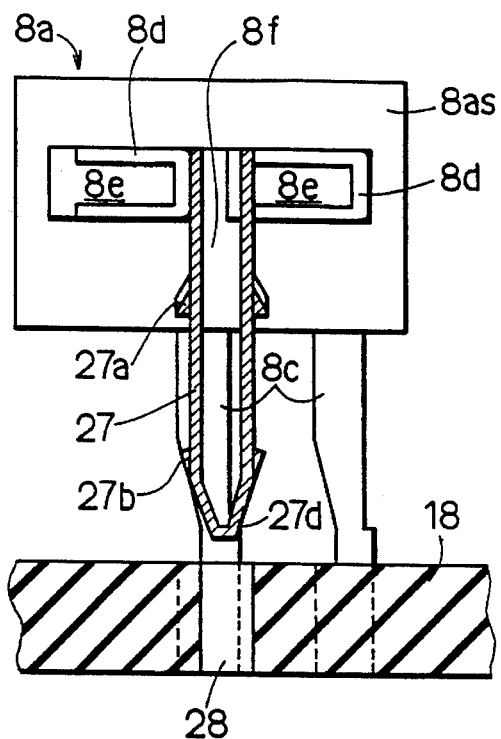
FIGS. 3A and 3B are views illustrating a shorting member of a connecting member in the second embodiment.
Figure 3B:
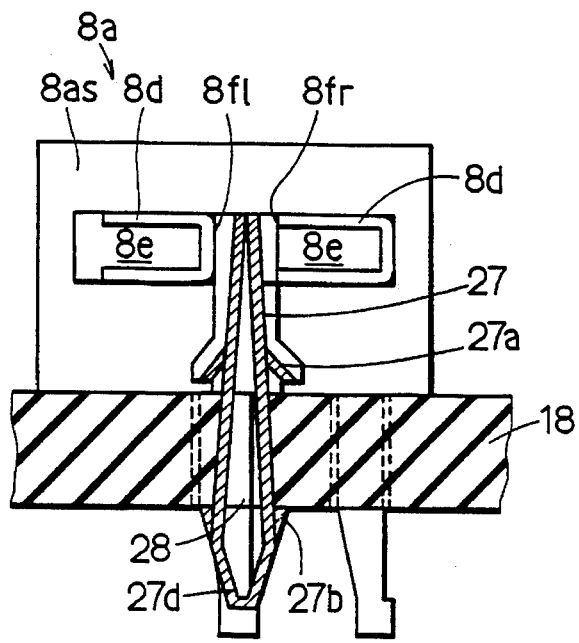

With reference to FIGS. 3A and 3B, the second embodiment will be explained.

In FIG. 3A, there is insertion of a U-shaped shorting member 27 perpendicular (up-down direction in figure) to an end portion 8 as of the connector 8a, thus short-circuiting conductive terminals 8d inside the connector 8a. The connector 8a has an opening portion 8e therein, and the conductive terminals 8d is crimped to the end of the connector cable (8b of FIG. 1) so that the conductive terminals 8d are inserted into the opening portion 8e from back side of the connector 8a (not shown in figure). Because the conductive terminals 8d emerges slightly from the opening portion 8e, it is possible to short-circuit the conductive terminal 8d on the end portion 8as by means of the shorting member 27. An insertion groove 8f for insertion of the U-shaped shorting member 27 to the end portion 8as is formed in the connector 8a so that the shorting member short-circuits the conductive terminals 8d precisely when the shorting member 27 is inserted in the insertion groove 8f. Then, at the circuit board 18 corresponding to the position of the groove 8f, a hole is formed for allowing insertion of a bottom portion 27d of the U-shaped shorting member 27. As shown in FIG. 3B, when the connector 8a is attached to the circuit board 18, the shorting member 27 contacts side walls of the hole 28 to release the short-circuiting of the conductive terminals 8d. The left side of the insertion groove 8f is 8fl and the right side is 8fr. The shorting member 27 has claw portions 27a to prevent the shorting member 27 from falling out. Additional claws 27b formed at the bottom portion 27d prevent the shorting member 27 from slipping off the circuit board 18 in case of the insertion in the circuit board 18. As a result, the connector 8a cannot separate easily after the attachment to the circuit board 18.

Figure 4A:
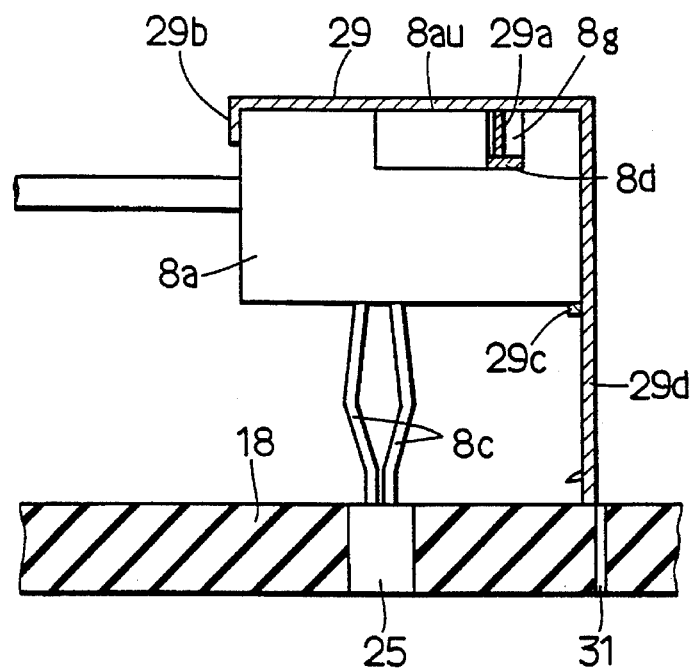
FIGS. 4A and 4B are views illustrating a shorting member of a connecting member in the third embodiment.
Figure 4B:
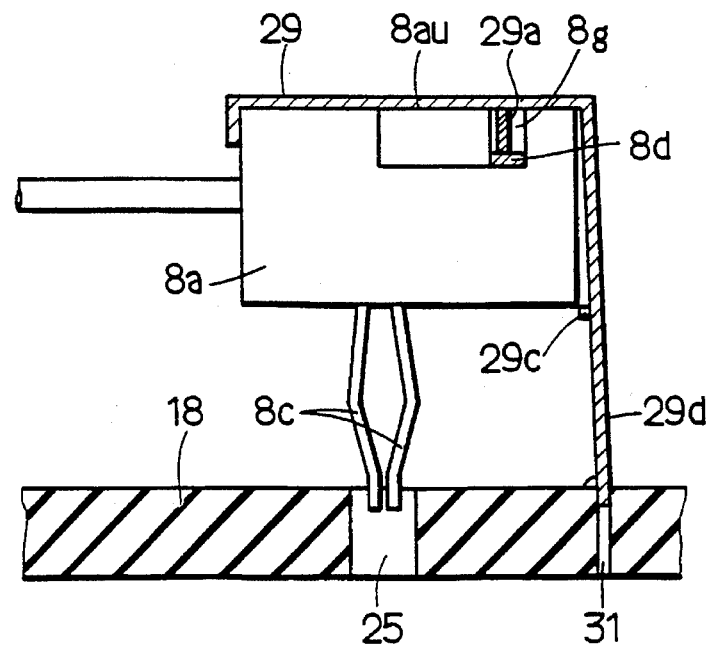

With reference to FIGS. 4A and 4B, the third embodiment will be explained.

FIGS. 4A and 4B show a shorting member with a removable structure. The shorting member 29 is temporarily attached to the connector 8a by means of a hook portion 29b thereof. A protrusion 29a for the short-circuiting is created on an upper surface 8au instead of on the end portion of the connector 8a. It carries out the short-circuiting of the conductive terminals 8d protruding from an opening 8g created to hold the conductive terminal 8d. In FIGS. 4A and 4B it is only possible to see the terminal 8d on one side. Actually, however, there are two terminals 8d in parallel array and there are protrusions 29a for simultaneous contacting with both terminals 8d. When attaching the connector 8a to the circuit board 18, a foot portion 29d of the shorting member 29 is caught on a small hole 31 created near the attachment hole 25, so that the pins 8c of the connector 8a is inserted in the attachment hole 25 while removing a claw portion 29c. As a result, simultaneous with insertion of the pins 8c, the protrusions 29a is released from the terminals 8d so that the shorting member 29 is removed from the connector 8a. Moreover, the shorting member 29 does not remain on the circuit board 18.

With reference to FIGS. 5A through 5D, the fourth embodiment will be explained.

Figure 5A:
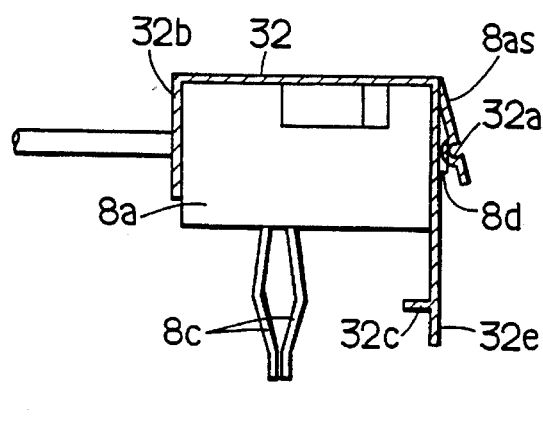
FIGS. 5A through 5D are views illustrating a shorting member of a connecting member in the fourth embodiment.
Figure 5B:
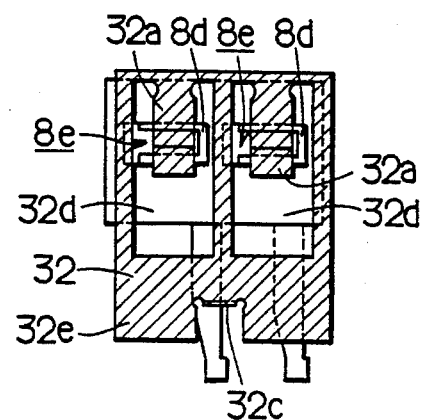
Figure 5C:
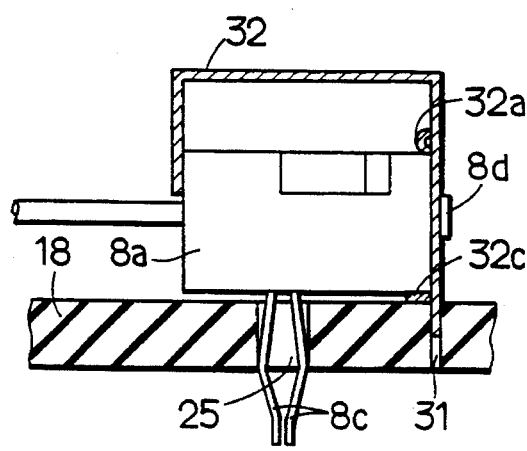

FIGS. 5A through 5D illustrate a shorting member 32 of the fourth embodiment. As shown in FIG. 5A, the conductive terminals 8d protruding in the opening section 8e opened in the side wall 8as of the connector 8a is short-circuited by a hook portions 32a of the shorting member 32, and the shorting member 32 is retained by a claw portion 32b. When attaching the connector 8a to the circuit board 18, a foot portion 32e of the shorting member 32 is inserted in a hole 31 created on the circuit board 18, and the pins 8c of the connector 8a is inserted in the attachment hole 25 on the circuit board 18. At this time, the shorting member 32 is prevented from moving on the board 18 by a retainer 32c. With the connector 8a sufficiently inserted, the retainer 32c is fixed by sandwiching it between the lower part of the connector 8a and the circuit board 18. The hook portion 32a, which short-circuits the conductive terminals 8d, slips from a short-circuiting position to a position located on the upper side of the connector 8a. As a result, even after attachment of the connector 8a, the shorting member 32 keeps being retained by being sandwiched between the connector 8a and the circuit board 18. The short-circuiting condition of the conductive terminals 8d at the side wall 8as is shown in FIG.

Figure 5D:
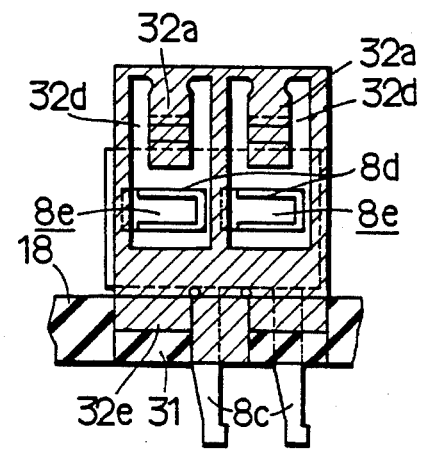

5B. When the connector 8a is attached to the circuit board 18, as shown in FIG. 5D, the terminals 8d comes to the section of a window 32d of the shorting member 32, so the short-circuiting is released.

Figure 6A:
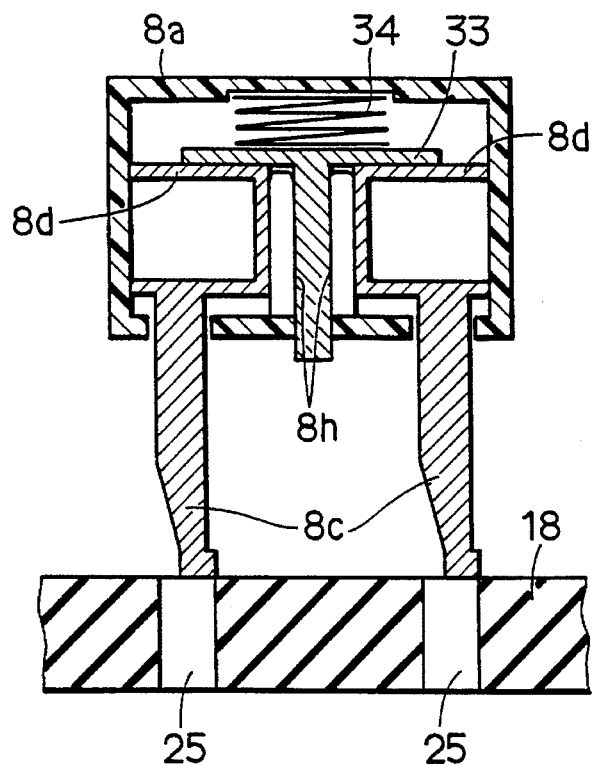
FIGS. 6A and 6B are views illustrating a shorting member of a connecting member in the fifth embodiment.
Figure 6B:
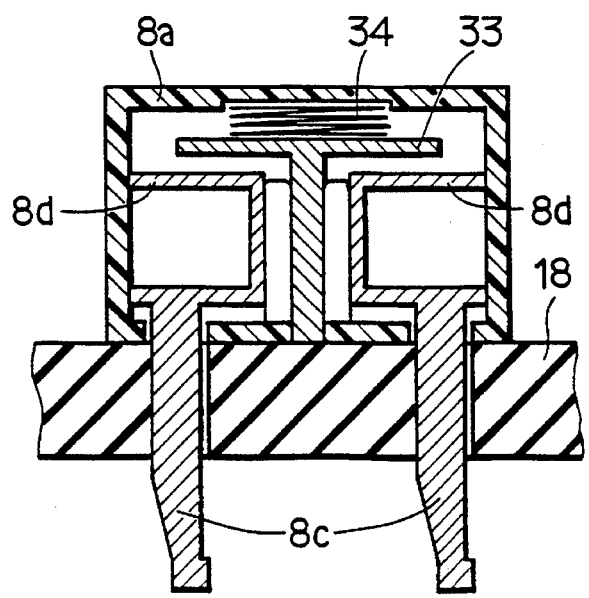

With reference to FIGS. 6A and 6B, the fifth embodiment will be explained.

The connector 8a shown in FIGS. 6A and 6B has a structure in which a shorting member 33 is created inside the connector 8a. The shorting member 33 is inserted to a groove 8h created between the two terminals 8d of the connector 8a so that the groove has no contact with the two terminals 8d. The terminals 8d are short-circuited with the shorting member 33 by a elastic member 34 (e.g., a plate spring or spring created inside the connector 8a. The figure shows a spring) pressing down the shorting member 33. The shorting member 33 protrudes from the bottom of the connector 8a. When attached to the circuit board 18, this protruding section of the shorting member 33 is pushed upward by the circuit board. The elastic member 34 is compressed and the short-circuiting state is released. If the connector 8a is not attached to the circuit board 18, the short-circuiting state is maintained because the shorting member 33 is pressed down constantly by the elastic member 34. The pins 8c of the connector 8a is inserted in the attachment hole 25 of the board 18 so that the shorting member 33 is pushed up by the board 18, thus pushing up the elastic body 34 and releasing the short-circuiting. A state is maintained in which the connector 8a is pushed against the board 18, and the pins 8c of the connector 8a is soldered to the circuit board 18.

Figure 7A:
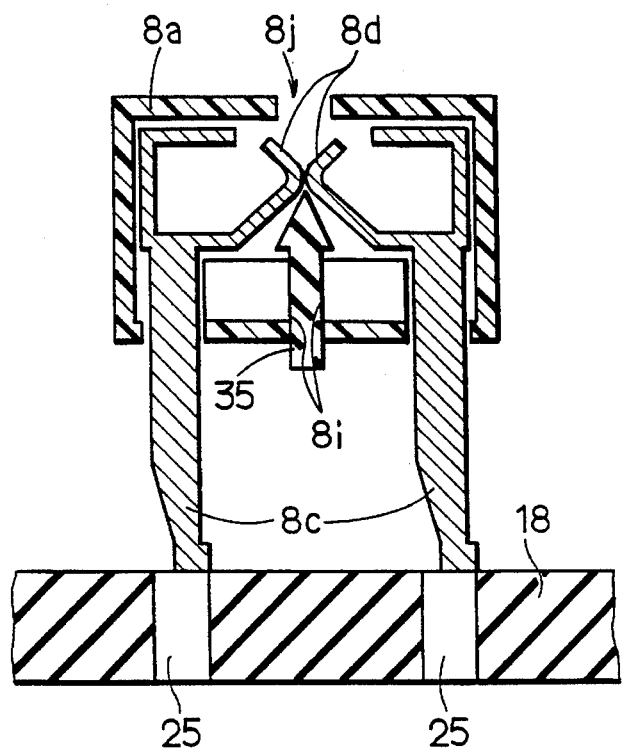
FIGS. 7A and 7B are views illustrating a shorting member of a connecting member in the sixth embodiment.
Figure 7B:
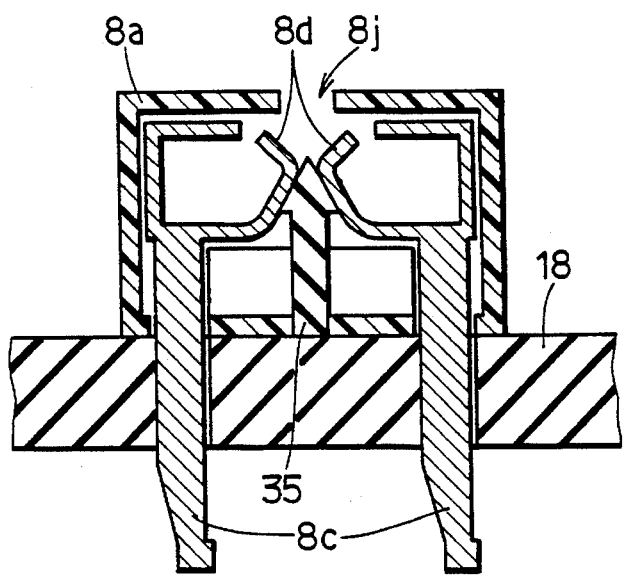

With reference to FIGS. 7A and 7B, the sixth embodiment will be explained.

With the embodiment shown in FIGS. 7A and 7B, the terminals 8d of the connector 8a are in a state in which there is a prior short-circuiting state. In such a case, the shorting member is the short-circuiting section of the terminals 8d (section where 8d contacts in FIG. 7A). With the short-circuiting section shown in FIG. 7A, an insulation plate 35 is located as short-circuiting release means in a groove 8i created on the bottom of the short-circuiting section inside the connector 8a, so that, when the pins 8c of the connector 8a are inserted in the attachment holes 25 of the circuit board 18, the insulation plate 35 is pushed up by the circuit board 18, thus being pushed into the short-circuiting section of the terminals 8d and releasing the short-circuiting of the terminals 8d as shown in FIG. 7B. It is possible by means of an opening portion 8j created on the upper surface of the connector 8a to judge whether the short-circuiting is released or not. The pins 8c of the connector 8 is soldered to the circuit board 18 in this state.

Figure 8A:
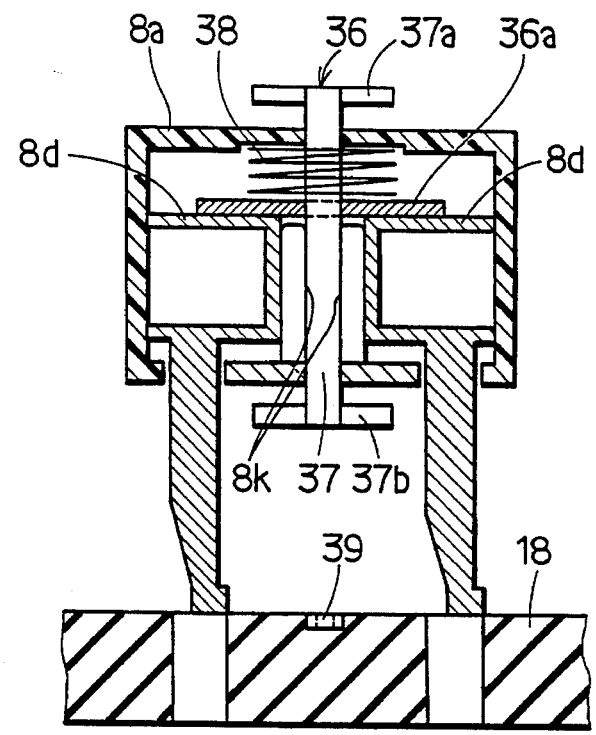
FIGS. 8A and 8B are views illustrating a shorting member of a connecting member in the seventh embodiment.
Figure 8B:
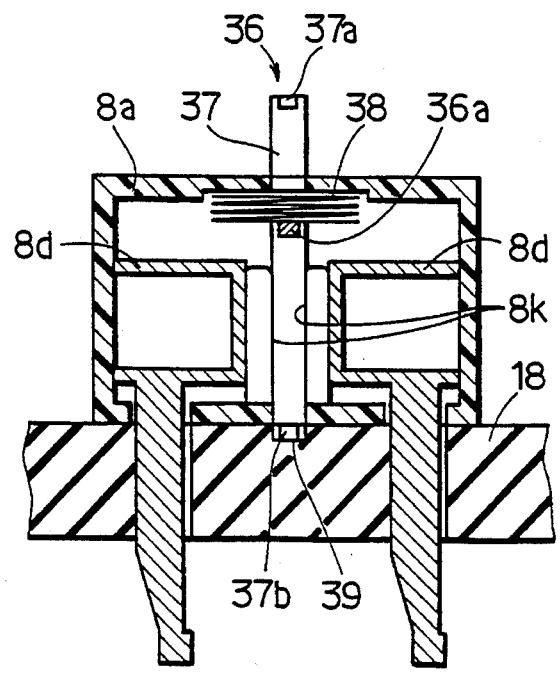

With reference to FIGS. 8A and 8B, the seventh embodiment will be explained.

As shown in FIGS. 8A and 8B, in a groove 8k created between the two terminals 8d of the connector 8a so that the groove 8k has no contact with the two terminals 8d, there is a rotating axis 37 for making a rotation of a short-circuiting rod 36a on the terminals 8d, and a grip 37a for rotation of the rotating axis 37. The shorting member 36 is composed of the short-circuiting rod 36a, the rotating axis 37 and the grip 37a. It resembles the structure in FIG. 6 since the terminals 8d of the connector 8a are short-circuited inside the connector 8a. However, the structure in FIGS. 8A and 8B differs from that in FIG. 6 in that, regarding the shorting member 36, the short-circuiting rod 36a in the form of a bar extends at a right angle (left-right direction in figure) to the longitudinal direction of the terminals 8d (vertical direction in figure). When the short-circuiting rod 36a rotates 90 degrees, the short-circuiting rod 36a fits precisely between the terminals 8d so that the short-circuiting is released. Also, in order that the short-circuiting rod 36a can contact well with the terminals 8d, there is an elastic member 38 (plate spring or spring, etc.) which pushes toward the terminals 8d the short-circuiting rod 36a attached to the rotating axis 37. There is also a structure in which a grip 37a protrudes into the upper part of the connector 8a so that, if the connector 8a is not attached to the circuit board 18, the grip 37a is set in the short-circuiting state. If the connector 8a is attached to the circuit board 18, there is 90 degrees rotation of the rotating axis 37 by the grip 37a to release the short-circuiting. In this case, as a further fail-safe mechanism, it is preferable to create a protrusion 37b in the form of a grip showing the rotating position of the rotating axis 37 under the connector 8a. There is also creation in the circuit board 18 of an indentation 39 fitting the protrusion 37b in a state releasing the short-circuiting, so that, in a short-circuiting state, the connector 8a can not be actually attached to the circuit board 18. Also, when it is actually attached, there is pushing up of the elastic member 38 so that the short-circuiting rod 36a is released from the terminals 8d (FIG. 8B).

Figure 9B:
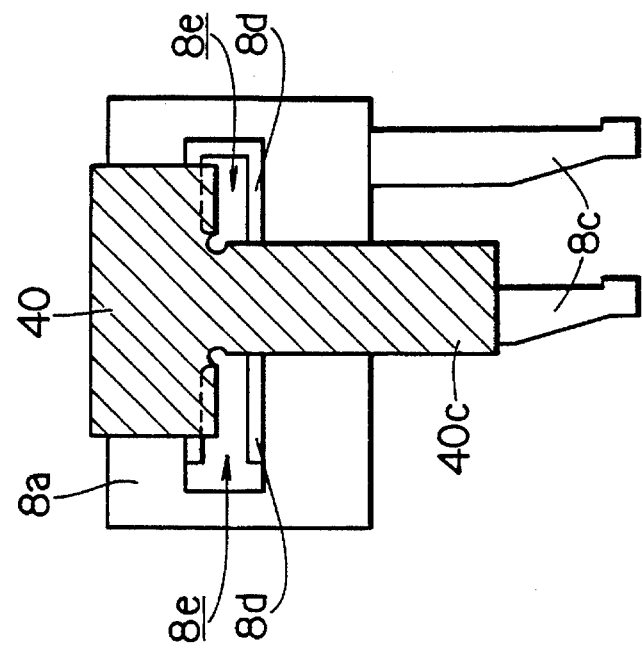
FIGS. 9A and 9B are views illustrating a shorting member of a connecting member in the eighth embodiment.
Figure 9A:
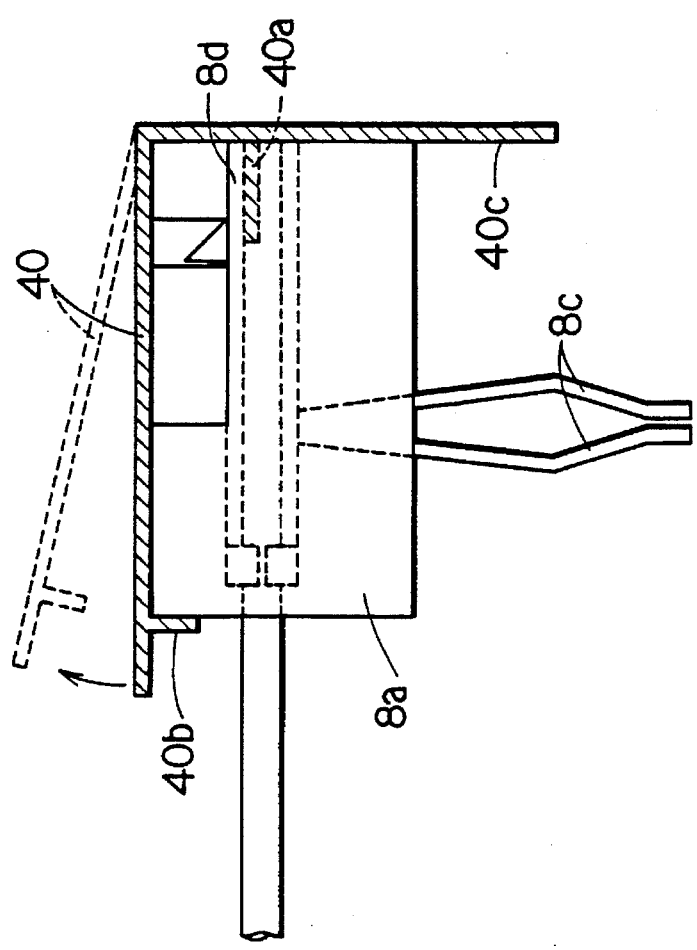

With reference to FIGS. 9A and 9B, the eighth embodiment will be explained.

FIGS. 9A and 9B shows a connector 8a having a structure that a shorting member 40 is removable. In other words, as shown in FIG. 9A and 9B, the shorting member 40 is in a state where a shorting section 40a short-circuits the terminals 8d from the openings 8e of the side wall of the connector 8a. Another claw 40b of the shorting member 40 is temporarily fixed to the connector 8a. The short-circuiting state by the shorting section 40a is maintained prior to attaching the connector 8a to the circuit board 18. When inserting the pins 8c of the connector 8a in the attachment hole of the circuit board (not shown in figure), the claw 40b is pulled up to remove the shorting member 40. As shown in FIG. 9A or 9B, a foot portion 40c of the shorting member 40 extends to the board 18. Thus it is not possible to insert the pins 8c of the connector 8a in the circuit board 18 when the shorting member 40.

Figure 10B:
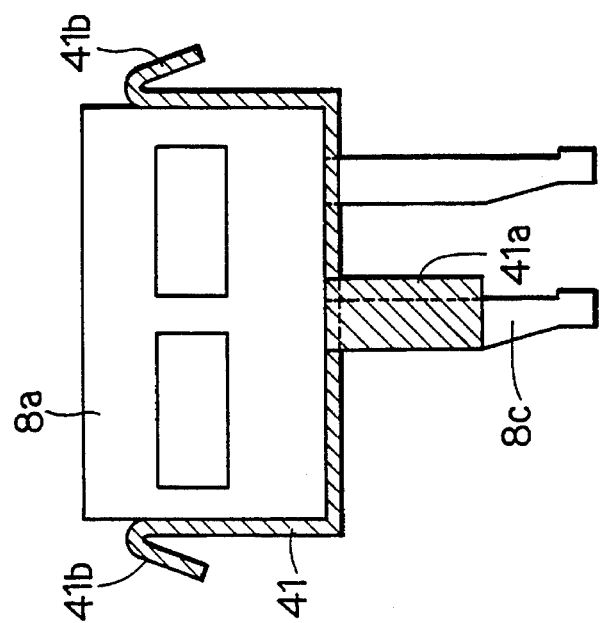
FIGS. 10A and 10B are views illustrating a shorting member of a connecting member in the ninth embodiment.
Figure 10A:
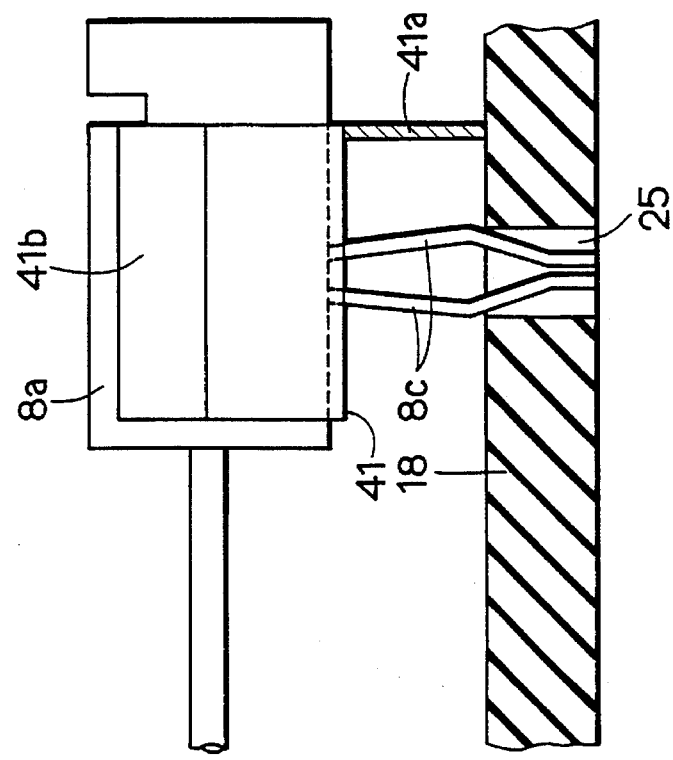

With reference to FIGS. 10A and 10B, the ninth embodiment will be explained.

With the structure shown in FIGS. 10A and 10B, a shorting member 41 is attached to the bottom of the connector 8a, as in conventional connector, thus pins 8c of the connector 8a are short-circuited. At the same time, there is a protrusion 41a which has half the length of the pins 8c. Thus, it is impossible to insert the pins 8c of the connector 8a in the attachment hole 25 of the circuit board 18 as long as the shorting member 41 is attached. When the connector 8a is attached, grips 41b created on both ends of the shorting member 41 are used to pull out, and the pins 8c are insert in the board 18 after removing the shorting member 40. This can be implemented regardless of the type of configuration, such as the size of the connector.

Figure 11:
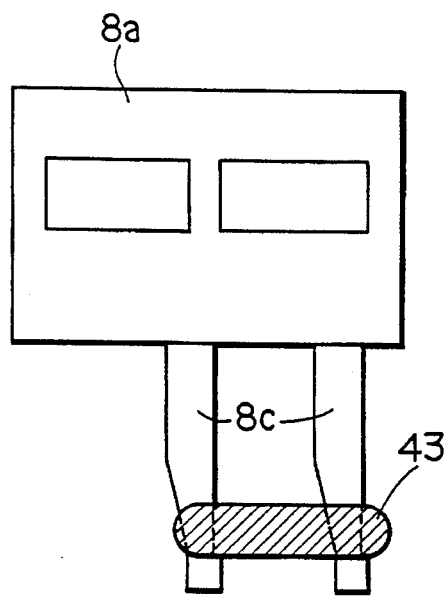
FIG. 11 is a view illustrating a shorting member of a connecting member in the tenth embodiment.

With reference to FIG. 11, the tenth embodiment will be explained.

In FIG. 11, solder 43 is used as a shorting member. In other words, the solder 43 is added beforehand as a shorting member to short-circuit the pins 8c. Because the pins 8c of the connector 8a is soldered when the connector 8a is attached to the board (not shown in the figure), the solder 43 is utilized for soldering to fix the pins 8c to the board. The solder 43 is melted and the short-circuiting state is released.

If the pins gap is somewhat large, it is also possible to include conductor (not shown in figure) such as a lead wire inside the solder 43.

With reference to FIGS. 14A through 14D, the eleventh embodiment will be explained.

FIGS. 14A through 14D show a structure in which, by soldering pins 53 to the circuit board 18, a connecter 50 is formed to be a single-block construction with the circuit board 18. FIG. 14A is a front view, FIG. 14B is a top plan view, FIG. 14C is a left side view, and FIG. 14D is a right side view.

The connector 50 comprises a plastic housing 51 and bipolar terminals 54 which are crimped with a connector cable 52 from the inflator 2 and are inserted and secured to a designated location of the housing 51.

Located on the right side of the housing 51 is first windows 56. A shorting member (not illustrated in FIG. 15) is inserted from the first window, and thereby short-circuiting the terminals 54. Also formed on the housing 51 are a pair of claws 55 which create a lock mechanism for the shorting member when the shorting member is fitted with the housing 51. Located on the terminals 54 are edges 54a and 54b for fitting with the shorting member. Also located on the bottom section 57 of the housing 51 are indentations 57a and 57b.

Located on the terminals 54 are pins 53 for an insertion in the circuit board 18 in a vertical downward direction in relation to the longitudinal direction of the housing 51. The pins 53 are inserted and soldered to attachment holes previously formed in the circuit board 18.

By creating the connector 50 with a structure like that shown in FIGS. 14A through 14D, the connector cable 52 from the inflator 2 can be connected parallel to the horizontal direction of the circuit board 18, thus making it possible to keep the element mounting height low on the circuit board 18. This in turn makes it possible to create a more compact the airbag device and simplify routing of the connector cable 52 from the inflator 2.

Also, because of the indentations 57a and 57b included on the bottom section 57 of the housing 51, a gap is created between the circuit board 18 and the connector 50. As a result, after connecting the circuit board 18 and the connector 50, it is possible via the gap to allow escape to the outside of the excess dehumidifying agent painted on the surface of the circuit board 18 to prevent moisture. This in turn makes it possible to apply the dehumidifying agent with a uniform thickness.

FIGS. 15A through 15D show the structure of a short retainer 60 used as the shorting member for the connector 50 as shown in FIGS. 14A through 14D. FIG. 15A is a front view, FIG. 15B is a top plan view, FIG. 15C is a left side view, and FIG. 15D is a right side view.

The short retainer 60 is composed of a plastic housing 61 and short bar 62 that is made of low-resistance metal and formed in a U-shape, working as a shorting member inserted in the housing 61.

Included on the left side of the housing 61 is the opening 64 for insertion of the connector 50. Included in the lower part of the housing 61 is a pin protection section 63 working as protectors to protect the pins 53 of the connector 50 when the short retainer 60 is fitted with the connector 50.

Also included on the housing 61 on both sides of the opening 64 are a pair of claw retainers 65. When the short retainer 60 and the connector 50 are fitted, the claws 55 of the connector 50 and the claw retainers 65 are fitted, thus the short retainer 60 is fixed to the connecter 50 by the lock mechanism composed of the claws 55 and the claw retainers 65.

Regarding the short bar 62 inserted in the housing 61, its ends 62a and 62b are exposed on the outside. When the short retainer 60 is fitted with the connector 50, these ends 62a and 62b contact with the edges 54a and 54b of the terminals 54 via the first window 56 of the connecter 50 so that the edges 54a and 54b are short-circuited. As a result, it is possible to prevent a faulty ignition of the inflator 2 due to electrical interference (e.g. caused by a static electricity) occurring when the inflator 2 is not connected to the ECU 4 by the connector 50.

By releasing the lock mechanism composed of the claws 55 on the connector 50 and the claw retainers 65 on the short retainer 60, there is release of fitting of the connector 50 and the short retainer 60, so that the ends 62a and 62b of the short bar 62 and the edges 54a and 54b of the terminals 54 become in a non-contact state. As a result, it is possible to release the short-circuiting of the edges 54a and 54b of the terminals 54. Thus, the short retainer 60 functions as release means independent of the connector 50.

FIGS. 16A through 16C show a state in which the connector 50 as shown in FIGS. 14A through 14D is inserted in the opening 64 in the short retainer 60 as shown in FIGS. 15A through 15D. FIG. 16A is a front view, FIG. 16B is a plan view, and FIG. 16C is a side view.

As shown in FIGS. 16A through 16C, due to the fitting of the connector 50 and the short retainer 60, the ends 62a and 62b of the short bar 62 contact with the edges 54a and 54b of the terminals 54 via the first window 56 of the connector 50, so that it is possible to short-circuit the edges 54a and 54b of the terminals 54, thus preventing the faulty ignition due to the electrical disturbance (caused by the static electricity, etc.) occurring when the inflator 2 is not connected to the ECU 4 by the connector 50.

The claws 55 of the connector 50 fit with claw retainers 65 included on the both sides of the opening 64 of the short retainer 60, thus the short retainer 60 is fixed to the connector 50 by the lock mechanism. This prevents the release of short-circuiting of the edges 54a and 54b of the terminals 54 as a result of external interference (e.g., vibration) up to the time when the connector 50 is attached to the circuit board 18.

Furthermore, during fitting of the connector 50 and the short retainer 60, the pin protectors 63 of the short retainer 60 is so located that it guards the pins 53 of the connector 60, thus preventing warping of the pins 53 due to physical interference from the outside.

If the connector 50 is attached to the circuit board 18 while the short retainer is attached, because the connector cable 52 from the inflator 2 is short-circuited, there is the problem that the airbag device cannot operate. Thus, when attaching the connector 50 to the circuit board 18, a worker must not forget to remove the short retainer 60. Therefore, with this embodiment, the pin protectors 63 is included on the short retainer 60 so that, when the short retainer 60 fixed to the connecter 50, the connector 50 cannot be attached to the circuit board 18 by the pin protectors 63.

In other words, the pin protectors 63, in addition to the function of protecting the pins 53, also has the function of reminding the worker to remove the short retainer 60.

FIGS. 17A and 17B shows a structure of the twelfth embodiment in which, by including second windows 58 on the connector 50 as an exposure section for the terminal 54, so that, in a fitting state of the connector 50 and the short retainer 60, or in a non-fitting state, it is possible to carry out a properties test of e.g. short-circuiting resistance of the inflator 2.

Located on the housing 51 of the connector 50 are a pair of second windows 58 working as the exposure sections of the terminals 54, formed in the upper side where the terminals 54 are installed.

A testing device to carry out the properties test of the inflator 2 is composed of: (i) a pair of testing probes 71 that contact with the edges 54a and 54b of the terminals 54 via the second windows 58, (ii) a securing device 72 to secure the connector 50, (iii) a measuring equipment 73 containing a power source and measuring device which outputs measurement values based on electrical signals from the testing probes 71.

With employing a testing device of the above structure, when the connector 50 and short retainer 60 are in a fitted state or a non-fitted state, the connector 50 is secured with the securing device 72 and the testing probes 71 are contacted to the edges 54a and 54b of the terminals 54 via the second windows 58. The measuring equipment 73 outputs the measurement values based on the electrical signals from the testing probes 71. Thus it is possible to carry out testing of the short-circuiting resistance of the inflator 2, etc based on the measurement values.

By including second windows 58 on the connector 50 used for the testing of short-circuiting resistance, etc., it is easy to carry out testing of the shorting resistance, etc. of the inflator 2 prior to insertion of the connector 50 in the circuit board 18, thus achieving greater efficiency in production of the airbag device.

Likewise, by automation of the above testing utilizing the second windows 58 it is possible to achieve even greater efficiency during production of the airbag device.

As explained above, when connecting the connector cable from the inflator to the ECU board, it is no longer necessary to employ a conventional large connector including a short-circuiting mechanism. Instead, by basically creating the shorting member independent to the small connector, it is possible to achieve the objective more simply, reduce space required for the attachment and connect without negatively influencing assembly efficiency. Also in cases where it is necessary to disassemble the airbag device, as the structures shown in FIGS. 1, 6A, 6B, 7A, 7B, 8A and 8B, for example, when the connector is removed from the circuit board, it is possible to recover the short-circuiting state, thus maintaining safety.

Also, as shown in FIGS. 14A through 16C, by employing the short retainer 60 with a structure that is independent of the connector 50, it is possible to further improve assembly efficiency and realize a more compact airbag device.

The bottom of the connecter 50 includes indentations so that a gap is created between the connector 50 and the circuit board 18 when the connecter 50 is attached to the circuit board 18. Thus, when spreading a dehumidifying agent to prevent humidity from the surface of the circuit board 18, the excess of dehumidifying agent can be escaped from the indentations and the dehumidifying agent does not remain on the surface of the circuit board 18 so that it is possible to evenly distribute the dehumidifying agent on the surface of the circuit board 18, thereby improving the quality of the airbag device.

Furthermore, by including the lock mechanism composed of the craws and craw retainers for fixing the short retainer 60 and the connector 50, there is no release of short-circuiting due to external factors such as vibration, etc. during transport, thus increasing safety.

Also, by including the pin protectors on the short retainer to protect the connector pins, it is possible to prevent warping of the pins due to external physical factors, thus further improving the quality of the airbag device.

Likewise, because the short-circuiting of the terminals of the connector 50 is released by removing the short retainer 60 therefrom, the short retainer 60 as the release means is independent of the connector 50, thus eliminating the need for a complex connector structure and allowing a more compact airbag device.

In addition, as shown in FIGS. 17A and 17B, by including second windows on the connector 50 as the exposure section of the terminals, it is possible to carry out beforehand tests of the short-circuiting resistance, etc. of the inflator 2 while being capable of automatic testing, thus improving the quality of the airbag device and realizing better production efficiency.

The configuration of the connecting member in the claims are not limited to the connector configurations found in the embodiments. A connector of any shape is acceptable. In addition to the connector, even in the case of connecting parts with a configuration in which a cover is placed on the crimped terminal, it is workable as the shorting member. In some cases, the solder soldered to the terminals attached on the end of the cable can even utilize as the shorting member as explained the embodiment described above. That is, as for the shorting member, the cable from the inflator 2 has two conducting wires for electrical conduction, and the shorting member can be the conduction between the two conducting wires, where any configuration and any material is acceptable. The release means involves the structure to carry out temporary or permanent release of the short-circuiting state and thus eliminating conduction between the two conduction wires. It is needless to say, there are no limitations in terms of materials, configuration and method regarding the release means.

What is claimed is:

1. An airbag device comprising:

an inflator generating gas at time of operation;

an airbag which is deployed by the gas from said inflator;

deceleration detection means for detecting a deceleration in case of a vehicle collision and outputting a detection signal;

an electronic control circuit for determining based on the detection signal from said deceleration detection means whether the vehicle collision has occurred and outputting an operational signal to cause said inflator to operate;

a pad for containing said inflator, said airbag and said electronic control circuit;

connecting member having a plurality of terminals and attached to an end of the electronic control circuit side of a connecting cable transmitting the operational signal to the inflator; and shorting member for short-circuiting said terminals at least until said terminals are electrically connected to the electronic control circuit, the electrical connection being made by inserting the terminals in attachment holes of a board on which said electronic control circuit is formed.

2. An airbag device comprising:

an inflator generating gas at time of operation;

an airbag which is deployed by the gas from said inflator;

deceleration detection means for detecting a deceleration in case of a vehicle collision and outputting a detection signal;

an electronic control circuit for determining based on the detection signal from said deceleration detection means whether the vehicle collision has occurred and outputting an operational signal to cause said inflator to operate;

a housing for housing said electronic control circuit and fixing said inflator and said airbag thereon;

connecting member having a plurality of terminals and attached to an end of the electronic control circuit side of a connecting cable transmitting the operational signal to the inflator, said connecting cable passing through an opening formed at said housing and being pulled out to the vicinity of a board on which said electronic control circuit is formed, said terminals of the connecting member being inserted in attachment holes of said board to maintain electrical conduction with said electronic control circuit; and shorting member for short-circuiting said terminals at least until said terminals are inserted in said attachment holes of said board.

3. An airbag device as claimed in claim 1 further comprising:

release means included in said connecting member and for releasing the short-circuiting of said terminals when said terminals are inserted in said board.

4. An airbag device as claimed in claim 3, wherein said release means has a hole portion formed on the side of the attachment holes of said board and releases the short-circuiting of said terminals by hooking said shorting member onto said hole portion when said terminals of said connecting member are inserted in said attachment holes.

5. An airbag device as claimed in claim 3, wherein said release means separates said shorting means from connecting member when said terminals of said connecting member are inserted in said attachment holes, said shorting member being temporarily hold to said connecting member so that said shorting member can separate from said connecting member to release the short-circuiting of said terminals.

6. An airbag device as claimed in claim 3, wherein said release means releases the short-circuiting of said terminals by making said shorting member sliding when said terminals of the connecting member are inserted in said attachment holes.

7. An airbag device as claimed in claim 3, wherein said release means has a release member installed in said connecting member, said release member pushed by said board and moving to release the short-circuiting of said terminals when said terminals of said connecting member are inserted in said attachment holes.

8. An airbag device as claimed in claim 3, wherein said release means is a rotating mechanism for rotating said shorting member and releasing the short-circuiting of said terminals by the rotation of said shorting member when said terminals are inserted in said attachment holes.

9. An airbag device comprising:

an inflator generating gas at time of operation;

an airbag which is deployed by the gas from said inflator;

deceleration detection means for detecting a deceleration in case of a vehicle collision and outputting a detection signal;

an electronic control circuit for determining based on the detection signal from said deceleration detection means whether the vehicle collision has occurred and outputting an operational signal to cause said inflator to operate;

a housing for housing said electronic control circuit and fixing said inflator and said airbag thereon;

a member having a plurality of terminals and attached to an end of the electronic control circuit side of a connecting cable transmitting the operational signal to the inflator, said connecting cable passing through an opening formed at said housing and being pulled out to the vicinity of a board on which said electronic control circuit is formed, said terminals of the connecting member being soldered to said board to maintain electrical conduction with said electronic control circuit; and shorting member for short-circuiting said terminals at least until said terminals are soldered to said board.

10. An airbag device as claimed in claim 9 further comprising:

release means established to be independent of said connecting member and for releasing the short-circuiting of said terminals when said terminals of said connecting member are soldered to said board.

11. An airbag device as claimed in claim 9, wherein at least either one of said connecting member or said shorting member include a lock mechanism for connecting said connecting member and said shorting member.

12. An airbag device as claimed in claim 9, wherein said shorting member has a guard section to guard said terminals when said shorting member is attached with said connecting member.

13. An airbag device as claimed in claim 9, wherein said connecting member includes an exposure section for said terminals thereof.

14. An airbag device as claimed in claim 1, wherein said shorting member is attached to said terminals so that said terminals can not be attached directly to said board when said shorting member is attached thereto, and said terminals are attached to said board only after removing said shorting member.

15. An airbag device as claimed in claim 1, wherein gap is created between said connecting member and said board.

16. An airbag device as claimed in claim 1, wherein the airbag device is installed in a steering wheel of a vehicle.

17. An airbag device as claimed in claim 2, wherein said shorting member is attached to said terminals so that said terminals can not be attached directly to said board when said shorting member is attached thereto, and said terminals are attached to said board only after removing said shorting member.

18. An airbag device as claimed in claim 2, wherein the airbag device is installed in a steering wheel of a vehicle.

19. An airbag device as claimed in claim 2, wherein gap is created between said connecting member and said board.

20. An airbag device as claimed in claim 9, wherein said shorting member is attached to said terminals so that said terminals can not be attached directly to said board when said shorting member is attached thereto, and said terminals are attached to said board only after removing said shorting member.

21. An airbag device as claimed in claim 9, wherein the airbag device is installed in a steering wheel of a vehicle.

22. An airbag device as claimed in claim 9, wherein a is created between said connecting member and said board.

* * * * *